United States Patent Office 3,160,797
Patented Dec. 8, 1964

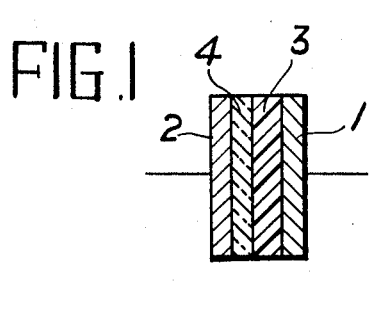
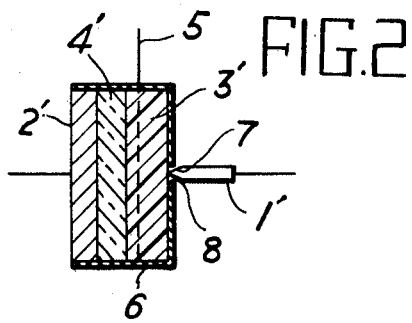
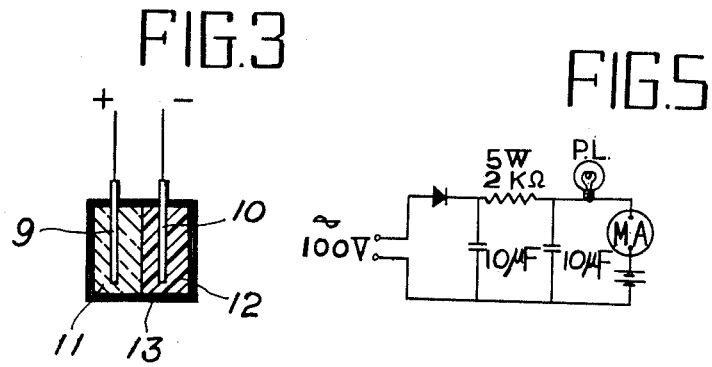
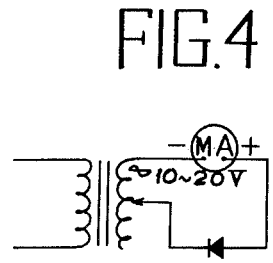

3,160,797
ELECTRIC CIRCUIT ELEMENT COMPRISING AN ASYMMETRIC COUPLE OF IONIC CONDUCTORS
Masakuni Kanai, 1050 Wadahoncho, Suginami-ku, Tokyo, Japan
Filed Dec. 10, 1959, Ser. No. 858,704
10 Claims. (Cl. 317—231)

The present invention relates in general to an element of an electric circuit, and in particular to electric conductors constituting both electrodes adapted to be impressed with an alternating current, and consisting of members of two sorts of substances which have different ionization tendencies, a glue material piece of an electrolyte, for instance dilute electrolyte, and a piece of porous material admixed with a fluoride or the like in contact with said glue material piece being disposed between the members.

One electrode is coated with a porous substance admixed with a fluoride or the like, which is also placed between the two electrodes. The glue material piece is preferably moistened with an electrolytic solution to a suitable wet condition, thus enabling the device according to this invention to become of a small size and low weight and adapted at the same time to endure great impacts such as by falling sidelong or even upside down. The element of this invention can be manufactured advantageously at an extremely low cost and easily.

The present invention will now be set forth with reference to the accompanying drawings in the following descriptions, and two examples of embodiment of the present invention are illustrated in the accompanying drawings, in which FIG. 1 is a diagrammatic sectional view of a first embodiment; FIG. 2 is also a diagrammatic sectional view of a second embodiment; FIG. 3 is a vertical sectional view of the first embodiments, when being used practically; FIG. 4 represents a circuit for the use in the measurement; and FIG. 5 is a circuit showing the method for charging electricity.

Referring to a first embodiment of the invention shown in FIG. 1, 1 and 2 represent metal plates respectively which are chosen to be two members each having a mutually different ionization tendency adapted to constitute two electrodes. 3 represents a glue material piece of an electrolyte, said glue material piece being preferably impregnated with an aqueous sodium carbonate solution. One face of the glue material piece 3 is closely adhered to said metal plate 1, the other face being brought in contact with metal plate 2 through porous material pieces 4 of calcium fluoride ($CaF_2$) as an agent for protecting electrodes. When an alternating current is passed across the metal plates 1 and 2, arranged in the construction just described, and if the side of a high ionization tendency; e.g. if metal plate 1, is chosen as an anode, or if said metal plate 1 becomes a cathode, the current ratio can be made remarkably high. The reason why the current ratio is high is due to the difference of ionization tendencies between both metal electrodes, or because an ionic current flowing in two directions is enhanced only in one direction in choosing a glue material piece of an adequate electrolyte and an appropriate porous material piece, which are placed between both electrodes. This can be used as a rectifier by adjusting conditions, because the phenomenon is analogous to the action of a diode, a selenium rectifier or a germanium diode. A similar procedure can also be used when a remarkable difference occurs in the ratio of areas for the electrode to the solution. Accordingly, the present invention is never limited to the dipolar construction from metal plates 1 and 2 as illustrated in this embodiment of this invention.

The second embodiment of the invention will be set forth with reference to FIG. 2 in the following description:

In the case of this embodiment, the general construction is similar to that of the first embodiment of this invention referred to above. According to this embodiment, 1' and 2' represent respectively metal plates. 3' is a porous material piece. 4' is a glue material piece. A grid 5 is inserted in said porous material piece 3', said grid being adapted to be impressed with a positive or a negative potential. Metal plate 2', porous material piece 3' and glue material piece 4' are wrapped together with an insulating layer 6. Metal plate 1' has a pointed head 7 which is arranged to contact the porous material piece 3' through a small hole 8 formed in insulating layer 6. In this case, the current passing across both electrodes increases sometimes and decreases sometimes as in the case of a triode. For this purpose, the liquid layer can be gelatinized or the electrode area can be decreased or other similar measures can be taken to increase the resistance between both electrodes, in order to provide a function corresponding to amplification by various vacuum tubes.

The embodiment illustrated in FIG. 3 represents one practical model. 9 is an aluminium plate and 10 is a carbon rod. 11 is a solid porous material piece comprising a fluorine compound and gypsum, in which an aluminium compound is included. 12 is a glue electrolyte piece prepared from a carbon powder kneaded with $Na_2CO_3$ which includes carbon rod 10. The plates 9 and 10, which constitute the two electrodes, are positioned parallel to one another insulated by a covering of paraffin 13. The dimensions of the apparatus amount practically to approximately 20 mm. x 25 mm. The signs, appearing in FIG. 3, are used to show the connection for electric current when a cell is charged. Inside the cell, current passes from 10 to 9; and to provide for a stabilized current flow electrode 10 is made of carbon. However, more current will pass when 10 is made of aluminium and 9 is carbon.

The results of rectification values determined by the circuit shown in FIG. 4 are as in the following tables:

(I) *0.1% Fluorine Compound Included*

| A.C. voltage (v.) | Rectified current (ma.) |
|---|---|
| 5 | 10 |
| 10 | 100 |
| 15 | 200 |
| 20 | 300 |

(II) *1% Fluorine Compound Included*

| A.C. voltage (v.) | Rectified current (ma.) |
|---|---|
| 5 | 30 |
| 10 | 120 |
| 15 | 250 |
| 20 | 400 |

(III) *One Example Wherein a Triode Is Used*

| Anode voltage (v.) | Anode current (ma.) | Grid voltage (v.) |
|---|---|---|
| 9 | 22 | 0 |
| 9 | 43 | 1.5 |

As it is obvious from above tables that the current can be varied widely depending on the voltage impressed, an amplificating action can be obtained by a further electrode inserted between both electrodes.

Furthermore, for the determination of charging values, a single dry cell of 1.5 v. was used for charging the dry cell. The specimen was consumed to around 0.1 v. and the apparatus as shown in FIG. 5 was used. Then, the purpose has been accomplished (1.5 v. in 5 minutes).

The foregoing description has been given in detail without thought of limitation since the inventive principles involved are capable of assuming other forms without departing from the spirit of the invention or the scope of the following claims.

I claim:

1. An element of an electric circuit comprising two electrodes, a layer of porous material including a fluorine compound, and a layer of glue material including an electrolyte, each of said layers being situated side by side to define a boundary therebetween, both said layers being disposed between said electrodes, the boundary between the glue material and porous material occasioning greater ion mobility from one said electrode toward the other of the electrodes, and electrolyte having a greater ion concentration that said porous material and fluorine compound.

2. An element of an electric circuit comprising two electrodes enclosed with electrical conductors, each electrode having a different content of inorganic substance between said conductors there being interposed a glue material member having an electrolyte and a porous material member having a fluorine compound therein in contact with said glue material member, the ion concentration in said glue material's electrolyte being different from the ion concentration of said porous material member and fluorine compound whereby greater electrical current flows from one electrode to the other than in the reverse direction when said electrodes are subjected to a source of potential of alternating polarity.

3. An element of an electric circuit comprising a metallic plate conductor, a plate of glue material thereagainst having a fluorine compound, a porous plate disposed against said plate of glue material, a grid disposed in said porous plate, said porous plate having an electrolyte and a metallic electrode member in contact with said porous plate.

4. An element of an electric circuit according to claim 3, wherein said first metallic plate, said glue material plate and said porous plate are covered with an insulation material and said second electrode plate is in contact with said porous plate through an opening in said insulation material.

5. An element of an electric circuit according to claim 3, including a grid inserted in said porous material member, said grid being connectable to a source of positive and negative potential to increase and decrease the current flow between said electrodes respectively.

6. An element of an electric circuit according to claim 3, wherein said porous material member is disposed to cover one of said electrodes and said glue material member is disposed to cover the other of said electrodes, said electrodes being disposed parallel to one another, and paraffin enclosing the complete assembly.

7. An element of an electric circuit according to claim 3, wherein one of said electrodes is composed of an aluminum plate and the other of said electrodes is composed of a carbon rod.

8. An element of an electric circuit comprising a porous material plate, a glue material plate having an electrolyte disposed adjacent said porous material plate and substantially parallel thereto, a first metal electrode disposed within said porous material plate, and a second metal electrode disposed within said glue material plate, said electrolyte and said porous material plate having different ion mobilities therein.

9. An element of an electric circuit according to claim 8, wherein said glue material plate includes a carbon powder and a carbonate, said second electrode disposed in said plate being of carbon.

10. An element of an electric circuit according to claim 8, wherein said first porous material plate includes a fluorine compound and an aluminum compound, said first electrode being aluminum.

References Cited in the file of this patent
UNITED STATES PATENTS

| | | |
|---|---|---|
| 1,059,002 | Ruprecht | Apr. 15, 1913 |
| 1,121,764 | Ruprecht | Dec. 22, 1914 |
| 1,645,085 | Bensing | Oct. 11, 1927 |
| 1,849,436 | Ruben | Mar. 15, 1932 |
| 1,872,214 | Andre | Aug. 16, 1932 |
| 1,891,206 | Ruben | Dec. 13, 1932 |
| 2,049,553 | Weaver | Aug. 4, 1936 |
| 2,085,413 | Bloomenthal | June 29, 1937 |